(12) United States Patent
Fry et al.

(10) Patent No.: US 7,506,358 B1
(45) Date of Patent: Mar. 17, 2009

(54) METHOD AND APPARATUS SUPPORTING NETWORK COMMUNICATIONS THROUGH A FIREWALL

(75) Inventors: Steven G. Fry, Oakland, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/456,692

(22) Filed: Dec. 9, 1999

(51) Int. Cl.
*H04L 29/00* (2006.01)
*G06F 21/00* (2006.01)

(52) U.S. Cl. .......................... 726/2; 713/168; 713/170; 726/14; 726/21; 709/224; 709/227; 709/228; 709/230; 709/244

(58) Field of Classification Search .............. 713/201, 713/168, 170; 370/401; 726/2, 14, 21; 709/224, 709/227, 228, 230, 244, 249
See application file for complete search history.

(56) References Cited

U.S. PATENT DOCUMENTS

| | | | | |
|---|---|---|---|---|
| 5,812,784 | A * | 9/1998 | Watson et al. ............. | 709/227 |
| 5,825,890 | A * | 10/1998 | Elgamal et al. ............ | 713/151 |
| 5,826,014 | A * | 10/1998 | Coley et al. .............. | 713/201 |
| 5,941,988 | A * | 8/1999 | Bhagwat et al. ........... | 713/201 |
| 5,944,823 | A * | 8/1999 | Jade et al. ................ | 713/201 |
| 5,983,350 | A * | 11/1999 | Minear et al. ............. | 713/201 |
| 6,064,671 | A * | 5/2000 | Killian ................... | 370/389 |
| 6,104,716 | A * | 8/2000 | Crichton et al. ........... | 370/401 |
| 6,308,238 | B1 * | 10/2001 | Smith et al. ............... | 710/310 |
| 6,349,341 | B1 * | 2/2002 | Likes ..................... | 709/249 |
| 6,418,471 | B1 * | 7/2002 | Shelton et al. ............. | 709/227 |
| 6,473,406 | B1 * | 10/2002 | Coile et al. ............... | 370/248 |
| 6,606,708 | B1 * | 8/2003 | Devine et al. ............. | 726/8 |
| 6,615,258 | B1 * | 9/2003 | Barry et al. ............... | 709/223 |
| 6,643,701 | B1 * | 11/2003 | Aziz et al. ................ | 709/227 |

(Continued)

OTHER PUBLICATIONS

M. Leech, et al. "SOCKS Protocol Version 5", Mar. 1996, RFC 1928, Network Working Group, pp. 1-8, (http://socks.permeo.com/rfc/rfc1928.txt).*

(Continued)

*Primary Examiner*—Carl Colin
(74) *Attorney, Agent, or Firm*—Campbell Stephenson LLP

(57) ABSTRACT

A method of communicating information between a first program and a second program over a network is described. The method includes relaying the information between the first program and a first communications program over a first network connection, relaying the information between the first communications program and a second communications program over a second network connection and relaying the information between the second communications program and the second program over a third network connection. Further, the first communications program creates the second network connection to the second communications program through a first firewall program, which prevents access to the first program initiated by the second program. Thus, the second network connection is initiated by the first communications program. The first communications program can be, for example, a protocol daemon and the second communications program can be, for example, a relay program. The first firewall program can also be configured to prevent access to the first program initiated by the second communications program.

46 Claims, 9 Drawing Sheets

U.S. PATENT DOCUMENTS

| | | | |
|---|---|---|---|
| 6,754,831 B2 * | 6/2004 | Brownell | 726/15 |
| 6,772,333 B1 * | 8/2004 | Brendel | 713/153 |
| 7,028,091 B1 * | 4/2006 | Tripathi et al. | 709/230 |
| 2002/0004847 A1 * | 1/2002 | Tanno | 709/249 |
| 2002/0124074 A1 * | 9/2002 | Levy et al. | 709/224 |
| 2002/0145977 A1 * | 10/2002 | Delattre et al. | 370/235.1 |

OTHER PUBLICATIONS

M. Leech, "Usename/Password Authentication for SOCKS V5", Mar. 1996, RFC 1929, The Internet Society, pp. 1-2, (http://socks.permeo.com/rfc/rfc1929.txt).*

* cited by examiner

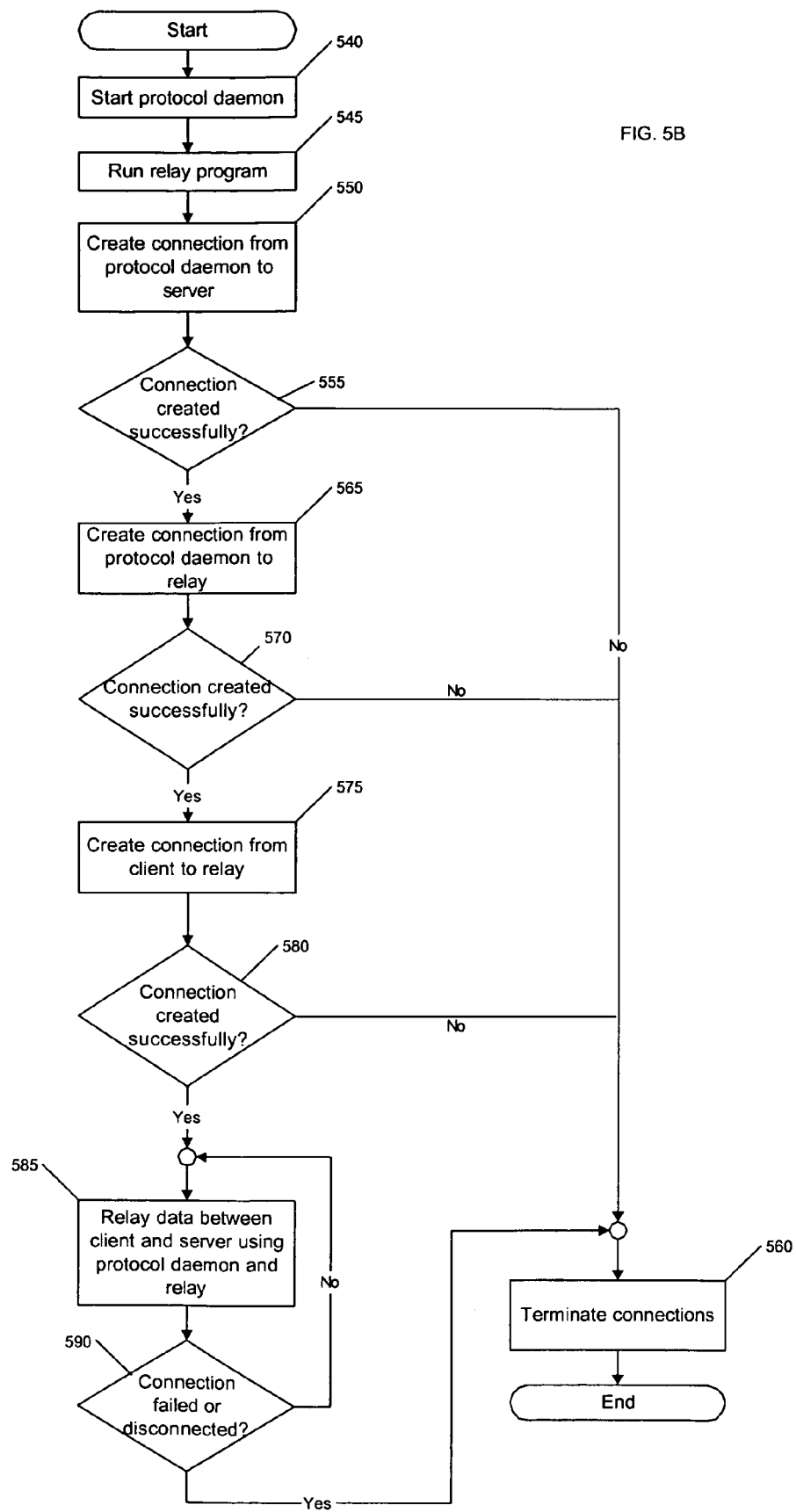

METHOD AND APPARATUS SUPPORTING NETWORK COMMUNICATIONS THROUGH A FIREWALL

BACKGROUND OF THE INVENTION

1. Field of the Invention

The present invention relates to computer networks, and, more particularly, to a method and apparatus for allowing network communications to proceed between two computers despite the fact that one or both of the computers are protected by a firewall.

2. Description of the Related Art

As the Internet has grown, security concerns have grown as well. In order to prevent unauthorized access to computer systems connected to the Internet, gateway systems commonly referred to as firewalls have been developed in order to prevent such unauthorized access.

FIG. 1 illustrates a network architecture 100 that employs such security measures. A computer system 105 is coupled to a firewall system 110 that allows access to a network 115. Also coupled to network 115 by a firewall system 120 is a computer system 125. Preferably, firewall systems 110 and 120 allow computer systems 105 and 125 transparent access to network 115, respectively, but prevent access to their respective computer systems originating from network 115. Thus, computer systems 105 and 125 are able to access other computer systems coupled to network 115 (e.g., a computer system 130). Such access may be accomplished by, for example, programs 135 and/or 140 accessing data 145 on computer system 130 using any one of a number of networking protocols, as illustrated by connections 131 and 132. In contrast, firewall systems 110 and 120 prevent access to computer systems 105 and 125, respectively, by other systems coupled to network 115 (e.g., programs running on computer system 130 (not shown)).

Firewalls such as firewall systems 110 and 120 normally control access to the computers thus protected by controlling the ability to create connections to and from the computers they protect. Firewall systems 110 and 120 are thus configured to allow computer systems 105 and 125, respectively, to initiate connections to systems on the opposite side of their respective firewalls, but prevent the computer systems on the opposite side from initiating connections to the computers protected by the firewalls.

However, it is often desirable to gain access to a system protected by a firewall from a system on the unprotected side of the firewall (also commonly referred to as the "dirty" side of a firewall). Because this type of access to a protected computer system is exactly that which a firewall is meant to prevent, the presence of a firewall impeded such access. For example, such is the case where a technical support group requires access to a customer's computer system. If both the customer's system and that of the technical support group are connected to a network, a desirable method of accessing the customer's system would be via that network. Traditional solutions to this dilemma include supporting the desired communications via the use of an alternate communications path (exemplified by a connection 146), or the disabling of either the customer's firewall or that of the technical support group (exemplified by a connection 147).

The former solution is illustrated in FIG. 1, where modems 151 and 152 allow computer systems 105 and 125 to communicate via a public telephone system 155. A similar alternative is to configure computer systems 105 and 125 to communicate using a private network. The latter solution of simply disabling the firewall can be used to permit an outside computer (e.g., in the case of computer system 105, computer systems 125 or 130) to access the formerly-protected computer system.

Unfortunately, these solutions are less than ideal. Using an alternate communication system entails the additional costs of the alternate communication system and the need to commit valuable resources to the alternate system's installation and maintenance, among other such concerns. For example, when implementing the alternate communication system shown in FIG. 1, modems 151 and 152 must be purchased and then connected to computer systems 105 and 125, respectively, as well as coupled to one another via public telephone system 155. This requires the operator of computer system 125 to arrange access to computer system 105 by some means and further requires that a modem-compatible connection be made available for their use. Thus, access to computer system 105 by computer system 125 using an alternate means of communication is both inconvenient and raises issues of compatibility.

On the other hand, defeating the security features of firewall system 110 to allow access to computer system 105 by computer system 125 opens computer system 105 to attack by any computer system attached to network 115. When put in such a state, computer system 105 thus becomes susceptible to computer hackers, computer viruses and the like. As a result, access by this method is likely not available on an immediate basis, requiring the authorization of the management of the company to which computer system 105 belongs. Moreover, such a method is often awkward due to the need for monitoring of the incoming data stream to prevent attacks on computer system 105 such as those mentioned previously. Given the foregoing issues and the need to access computer systems protected by a firewall, the ability to access a computer system through a firewall protecting that computer system would be of great use. Such a technique should be able to support the requisite communications without the use of an alternate means of communication, and without the need to inhibit the firewall's security features.

SUMMARY OF THE INVENTION

The present invention, in various embodiments, addresses the aforementioned problems by providing techniques for allowing communication between computers coupled to one another, possibly via a network, despite the fact of one or both computers are protected by a firewall. Embodiments of the present invention allow such communication without the need for an alternative communications path (e.g., telephone communications). Such communications are supported by employing modes of communication permitted by the firewall(s), and coupling these permitted connections to create an end-to-end connection that provides communication in the manner of a single communications path.

In one embodiment of the present invention, a method of communicating information between a first program and a second program over a network is described. The method includes relaying the information between the first program and a first communications program over a first network connection, relaying the information between the first communications program and a second communications program over a second network connection and relaying the information between the second communications program and the second program over a third network connection. Further, the first communications program creates the second network connection to the second communications program through a first firewall program, which prevents access to the first program initiated by the second program. Thus, the second network connection is initiated by the first communications program. As will be discussed, the first communications program can be, for example, a protocol daemon and the second communications program can be, for example, a relay program. The first firewall program can also be configured to prevent access to the first program initiated by the second communications program.

In certain aspects of the method, the first program requires the first network connection to be initiated as an in-bound network connection relative to the first program. That being the case, the first network connection is initiated by the first communications program as an in-bound connection relative to the first program. Further, the first firewall program can be configured, for example, to prevent access to the first program by preventing an in-bound network connection to the first program, the in-bound network connection being in-bound relative to the first program. In that case, the second network connection can be created, for example, as an out-bound network connection from the first communications program to the second communications program. The third network connection can be created, for example, through a second firewall program that prevents access to the second program initiated by the second communications program. In that case, the third network connection is initiated by the second program. In one aspect of the embodiment, the second firewall program prevents access to the second program by inhibiting an in-bound network connection to the second program (relative to the second program).

In another embodiment of the present invention, a method of communicating information between a first program and a second program over a network is described. The method includes relaying the information between the first program and a first communications program (which can be, for example, a relay program) over a first network connection and relaying the information between the first communications program and the second program over a second network connection. In this embodiment, the first program creates the first network connection to the first communications program through a first firewall program, which prevents access to the first program initiated by the second program. The first network connection is therefore initiated by the first program in such a configuration.

In yet another embodiment of the present invention, a method of communicating information over a network is described. The method includes relaying the information between a first program and a first communications program over a first network connection and relaying the information between the first communications program and a second program over a second network connection. In this embodiment, the first program requires the first network connection to be initiated as an in-bound network connection relative to the first program. Thus, the first network connection is initiated by the first communications program and is in-bound relative to the first program. Further, the first communications program creates the second network connection to the second program through a first firewall program that prevents access to the first program initiated by the second program. The second network connection is therefore initiated by the first communications program. The first communications program can be, for example, a protocol daemon.

A network according to one embodiment of the present invention includes a first program executed on a first computer, a first firewall program executed on a second computer coupled to the first computer, a second program executed on a third computer coupled to the second computer and a third program executed on a fourth computer coupled to the third computer. In this embodiment, the first firewall program is configured to prevent access to the first program initiated by the third program, while the first program is configured to initiate a first network connection to the second program through the first firewall program. The second program and the third program are also configured to support a second network connection between the second program and the third program. A second firewall program may also be included in the network, and is executed on a fifth computer coupled between the third computer and the fourth computer, if so provided. The second firewall program can be configured, for example, to prevent access to the third program initiated by the first program. Further, the first firewall program can also be configured to prevent access to the first program initiated by the second program, while the second firewall program can also be configured to prevent access to the third program initiated by the second program.

In one aspect of the embodiment, a fourth program, executed on a fifth computer coupled to the first computer, is provided as part of the network. The first program can then be configured to initiate a third network connection to the fourth program. In such a case, the fourth program is configured to require the third network connection to be initiated as an in-bound network connection relative to the fourth program. The third network connection is therefore an in-bound connection relative to the fourth program. Further, the first firewall program can be configured to prevent access to the first and the fourth programs by preventing in-bound network connections to the first and the fourth programs. In that case, the first network connection is created as an out-bound network connection from the first program to the second program.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Figure 1:
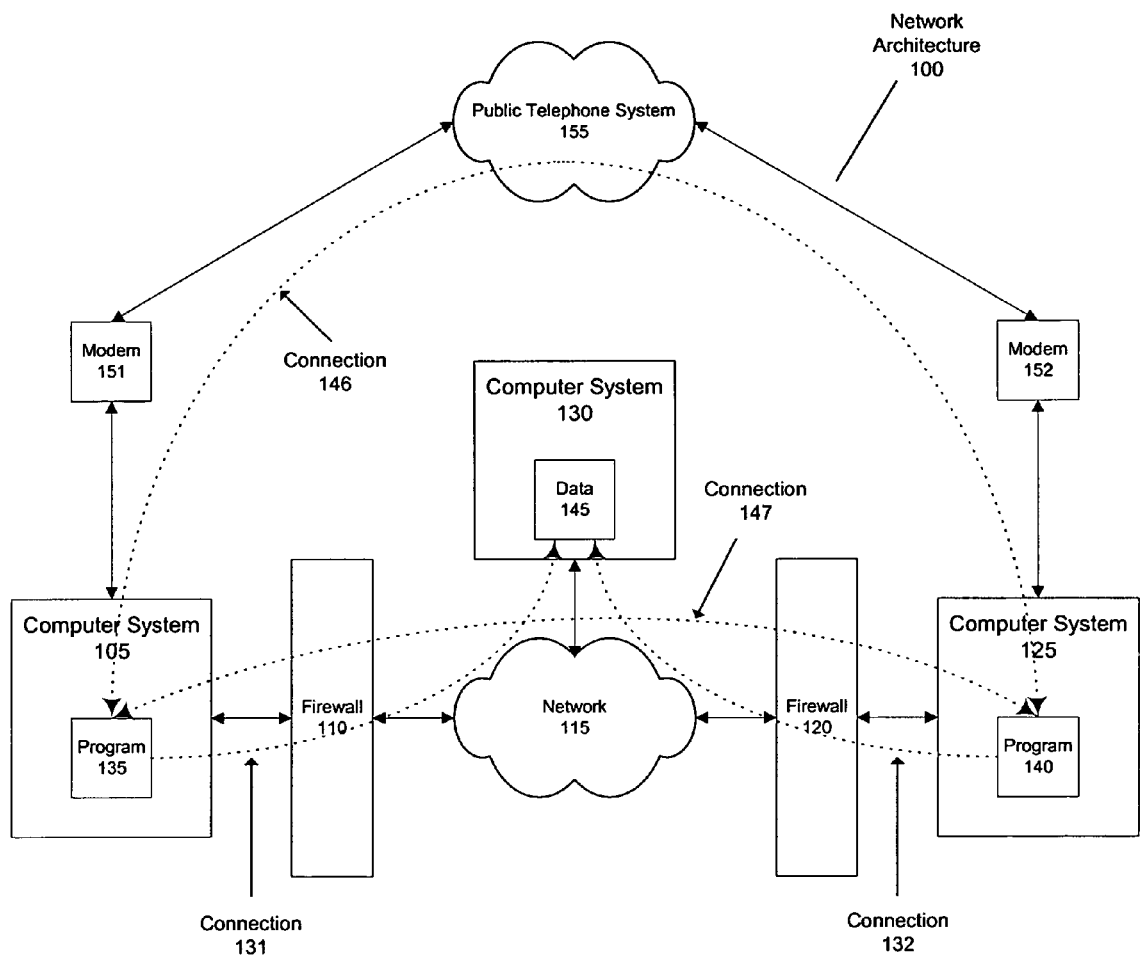
FIG. 1 is a block diagram illustrating a network architecture of the prior art.
Figure 2:
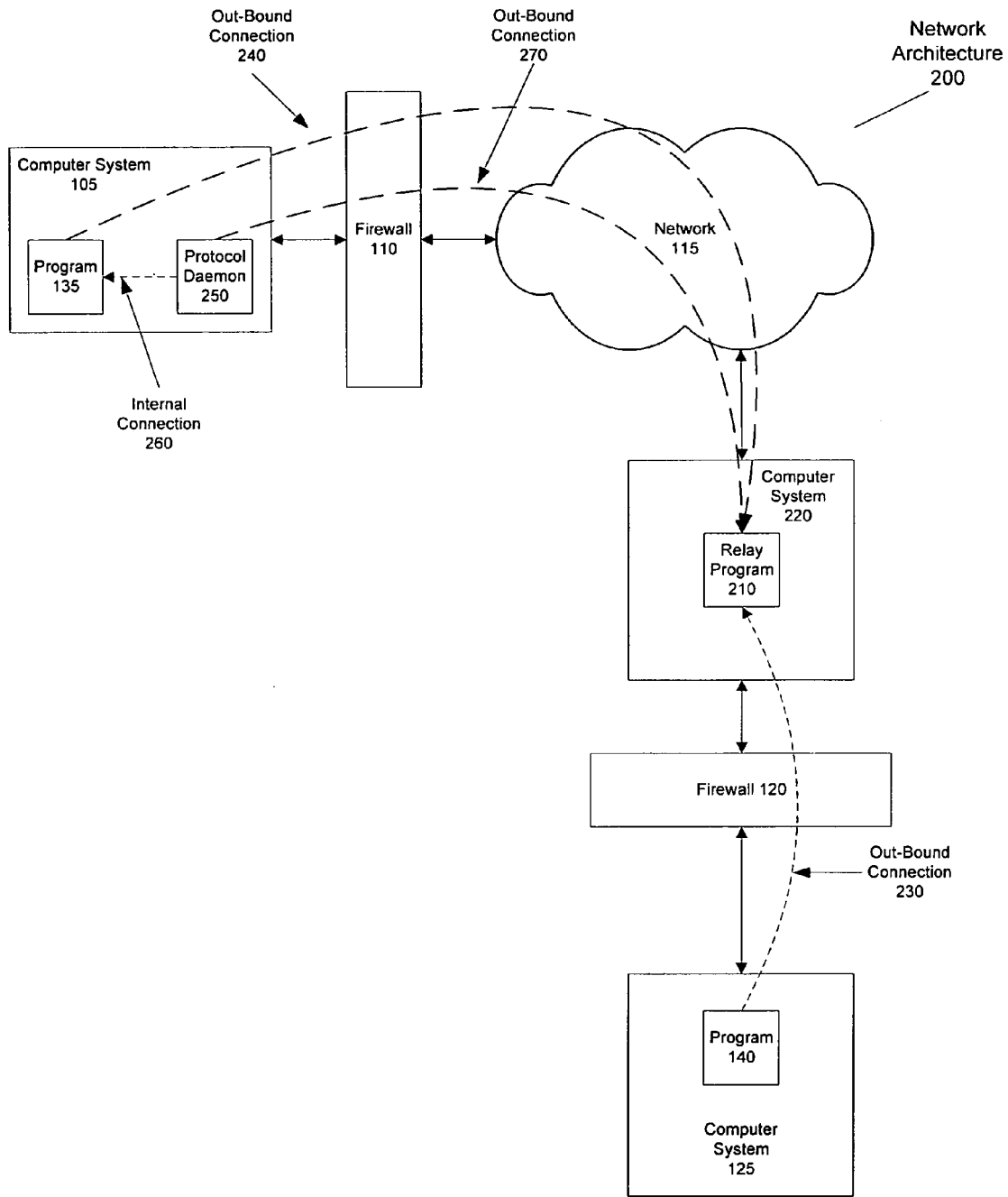
FIG. 2 is a block diagram illustrating a network architecture according to one embodiment of the present invention.

FIG. 2 is a block diagram illustrating one embodiment of a network architecture 200 according to the present invention. As with network architecture 100 of FIG. 1, program 140 cannot initialize communications with program 135 and, conversely, program 135 cannot initialize communications with program 140 while both firewall 110 and firewall 120 are operational. This is because firewalls 110 and 120 allow outgoing connection initialization, but do not allow the initialization of connections on an in-bound basis. By allowing only outbound connections (and preventing inbound connections), firewalls 110 and 120 effectively reduce the opportunity for outside entities (e.g., "hackers") to infiltrate computer systems 105 and 125. As will be apparent to those of skill in the art, the firewalls described herein may employ other measures (similar in effect to those just described) to prevent unauthorized access to computers protected by those firewalls, and such alternative techniques are intended to be comprehended by the methods discussed herein.

In order to support a connection between programs 135 and 140, network architecture 200 includes a relay program 210 running on a computer system 220. Such connections can employ, for example, the TCP/IP protocol to support Telnet connections between the various entities. As can be seen in FIG. 2, computer system 220 is coupled between firewall 120 and network 115, although computer system 220 could be coupled directly to firewall 110, or coupled between firewall 110 and network 115 with no substantive effect on the methods disclosed herein. Moreover, given software implementations (i.e., software programs) of the various functionalities described herein, it will be apparent to one of skill in the art that such programs may be distributed in various ways among one or more computers for execution. Relay program 210 acts to couple two in-bound connections to one another using the protocol employed by the two in-bound connections. Such a situation is illustrated in FIG. 2 by the initiation of an out-bound connection 230 from program 140 to relay program 210, and an out-bound connection 240 from program 135 to relay program 210. The process of making such a connection is described in further detail below with regard to FIG. 5*a*.

In the case where program 135 requires an in-bound connection (e.g., where program 135 is an application server), the inventors determined that some way to provide the in-bound connection required by program 135 and an out-bound connection to relay program 210 must be provided. Such functionality can be supported by providing a program capable of initiating the required connections. Such a program resides on the protected side of firewall 110 in order to initiate the requisite out-bound connection through firewall 110 in the stead of such a connection from program 135.

The requisite functionality may be provided, for example, by a daemon running on computer system 105. Such a daemon is illustrated in FIG. 2 as a protocol daemon 250. Such connections can employ, for example, the TCP/IP protocol to support Telnet connections between the various entities. Protocol daemon 250 initiates a in-bound connection to program 135 (illustrated in FIG. 2 as an internal connection 260). Protocol daemon 250 also initiates an out-bound connection 270 to relay program 210, via an out-bound port on firewall 110, in keeping with the paradigm supported by firewalls 110 and 120, although other protection techniques and alternative communication paths supported therein can be supported by embodiments according to the present invention. As before, program 140 initiates out-bound connection 230 to relay program 210. Relay program 210 then couples out-bound connections 230 and 270, relaying data between the two until such time as one of the connections either fails or is disconnected. From a conceptual standpoint, this coupling can be viewed as simply relaying data from one connection to another, or coupling the connections into a single connection. For added security, relay program 210 may require in-bound connections (i.e., out-bound connections 230 and 270) to provide a password that can be used to authenticate the connections and so avoid unauthorized access to either of computer systems 105 and 125. Optionally, the password can be subjected to bit manipulation (e.g., encoding) in order to make the password unreadable during transmission.

Figure 3:
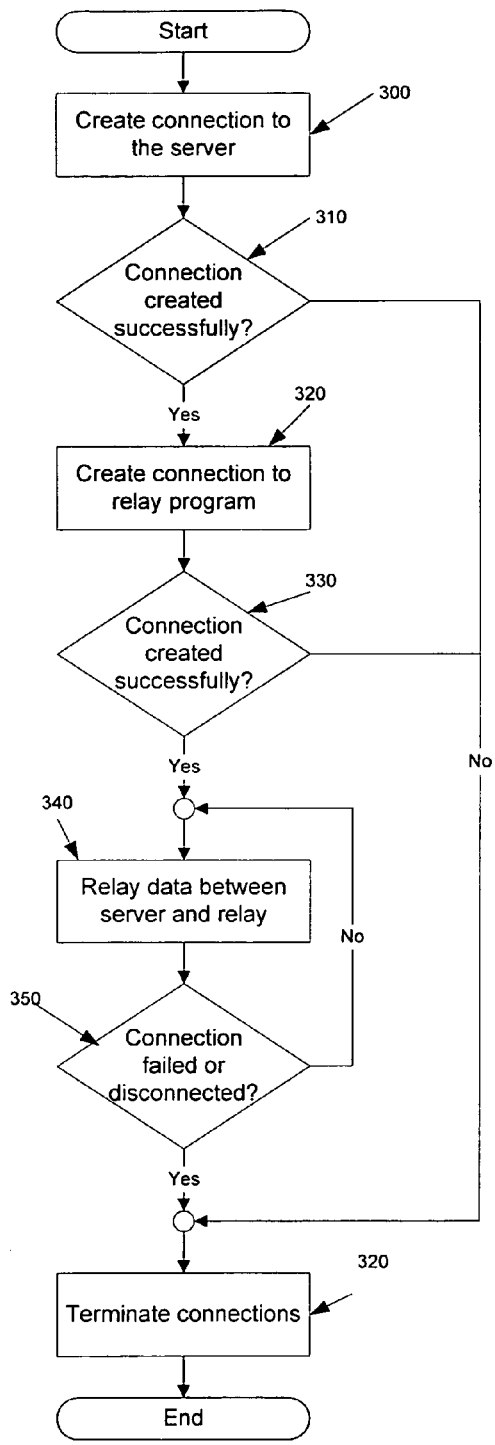
FIG. 3 is a flow diagram illustrating the actions performed by a protocol daemon according to one embodiment of the present invention.

FIG. 3 is a flow diagram illustrating operations performed by protocol daemon 250, should the use of such a protocol daemon be required to support connections between program 135 and entities on the "dirty" side of firewall 110. Such connections can employ, for example, the TCP/IP protocol to support Telnet connections between the various entities. When run, protocol daemon 250 creates a connection to program 135, illustrated in FIG. 3 as creating a connection to the server (step 300). If the connection is not successfully created (step 310), the attempted connection and all other pending, related connections are closed down (step 320). Alternatively, other connections may be left in place to await another connection request. If the connection is successfully created, protocol daemon 250 then attempts to create a connection to relay program 210 (step 320). Again, if the connection to relay program 210 is not successfully created (step 330), the attempted connection and all pending, related connections are closed down (step 320) (or the pre-existing connections ignored).

If a connection is successfully created to relay program 210 (represented in FIG. 2 as out-bound connection 270), data is relayed between program 135 and relay program 210 by protocol daemon 250 (step 340). This relaying of data continues until one of the two connections either fails or is disconnected (step 350), at which time the remaining connections are closed down (step 320). As will be apparent to one of skill in the art, the exact order of connection initialization is not critical, and so protocol daemon 250 can initiate either internal connection 260 or outbound connection 270 before the other without any substantive effect on the methods disclosed herein.

Each of the blocks of the flow diagram of FIG. 3, and those depicted in subsequent figures, may be executed by a module (e.g., a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the invention.

Figure 4:
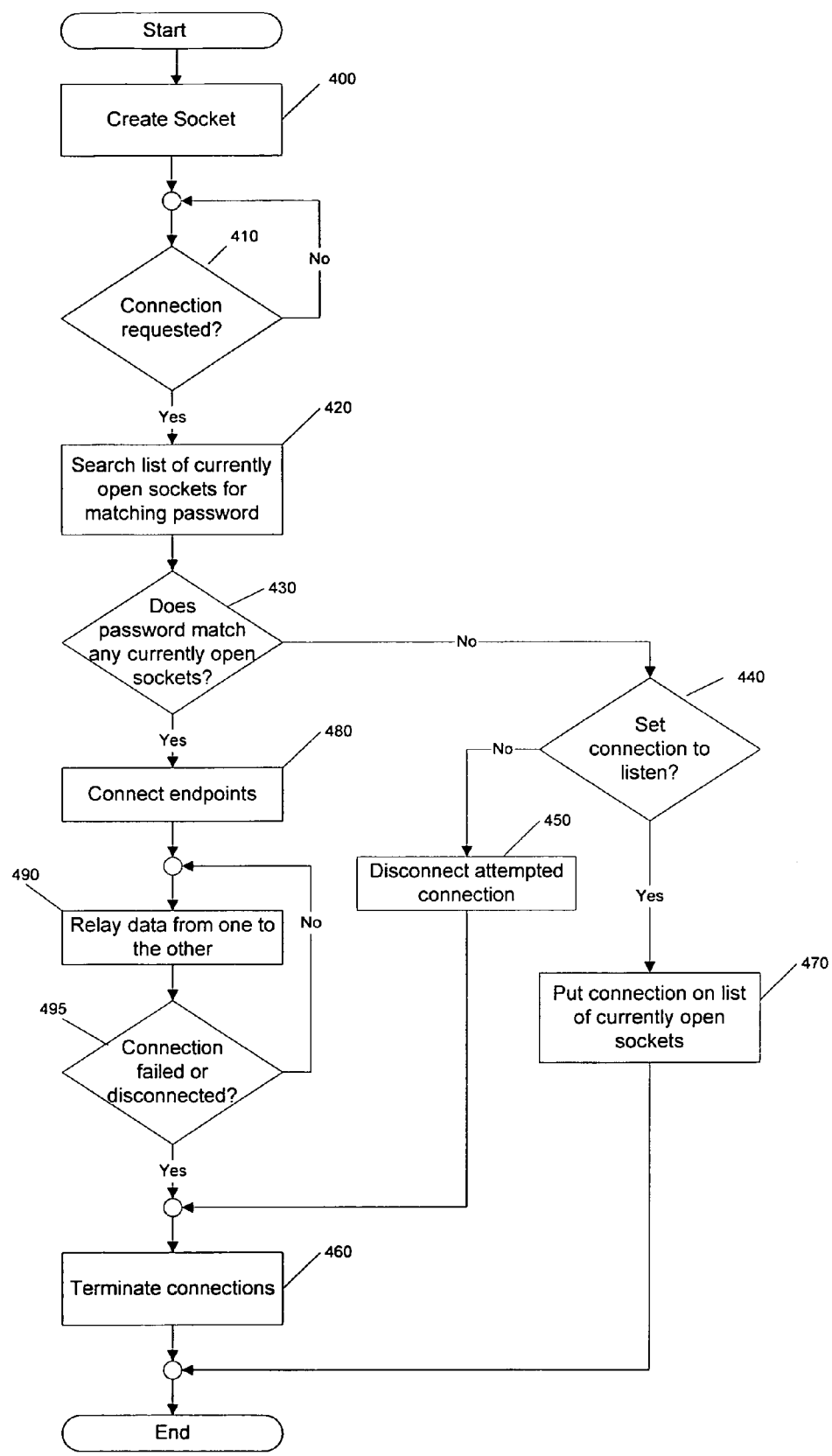
FIG. 4 is a flow diagram illustrating the actions performed by a relay program according to one embodiment of the present invention.

FIG. 4 is a flow diagram illustrating an exemplary set of operations that relay program 210 performs in supporting a connection between either of program 135 or protocol daemon 250, and program 140. Such connections can employ, for example, the TCP/IP protocol to support Telnet connections between the various entities. The exemplary process of FIG. 4 begins with the creation of a socket (step 400) for use by an in-bound connection. While the networking concept of a socket is employed in describing relay program 210, it will be apparent to one of skill in the art that the network connections referred to herein will be cast in terms of other programmatic constructs, and in fact, the appropriate construct will depend on the protocol being supported by the given embodiment of the present invention. These other programmatic constructs may be employed by such embodiments without deviating from the invention.

Upon the receipt of an in-bound connection requisition (step 410), a list of currently open sockets maintained by relay program 210 is searched in an effort to locate an open socket having a matching password (step 420). It will be noted that the process illustrated in FIG. 4 is one that uses passwords for each connection in order to provide enhanced security. Although passwords need not be employed, some method of determining which in-bound connections are to be coupled to other in-bound connections should be supported by relay program 210. Other such methods may include, for example, the use of network addresses, the use of verification strings (wherein a connection is attempted and only maintained upon the receipt of an alphanumeric string that verifies that the connection had been made by an authorized network element), and the like.

If the password provided does not match any of the current open sockets (step 430), relay program 210 makes the determination as to whether the attempted connection should be configured as a listening connection (step 440). If the requested connection is not to be left open in an effort to listen for a corresponding connection, the attempted connection is disconnected (step 450) and, if any, remaining connections are terminated (step 460). If the attempted connection is to be configured as a listening connection, the attempted connection is put on the list of currently open sockets (step 470).

Conversely, if the password of the attempted connection matches one or more of the currently open sockets, the end points are connected by relay program 210 (step 480). Once connected, relay program 210 relays data from one end point to the other end point (i.e., programs 135 and 140 of FIG. 2) (step 490). This relaying of data continues until one (or both) of the connections either fails or is disconnected (step 495), at which time all of the related connections are terminated (step 460).

Figure 5A:
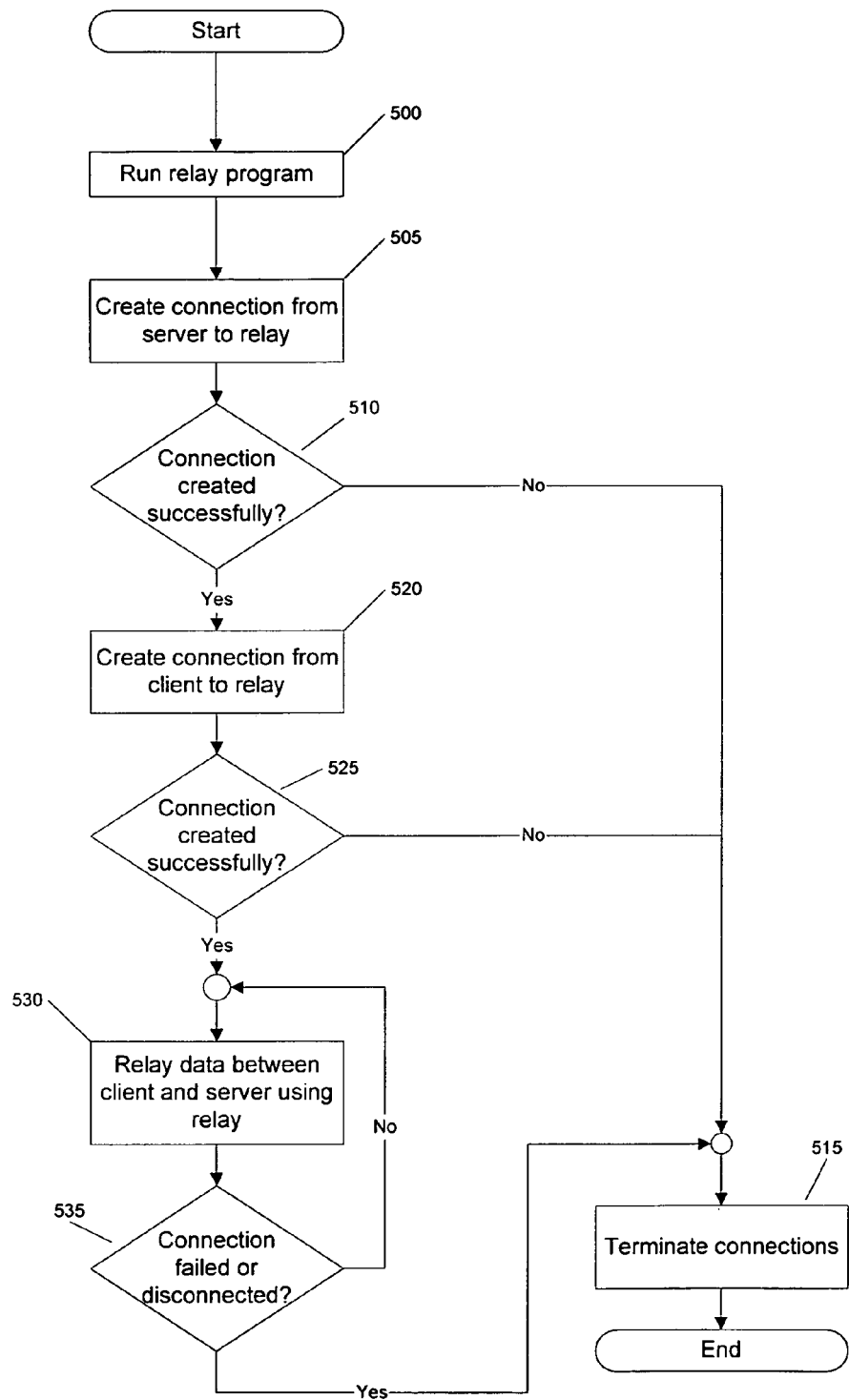
FIG. 5 is a flow diagram illustrating an overall process for relaying information between programs according to one embodiment of the present invention.

FIG. 5A is a flow diagram illustrating a process according to one embodiment of network architecture 200 in which relay program 210 relays data between programs 135 and 140 without the use of a protocol daemon. The exemplary process begins with the execution of relay program 210 (step 500). Program 135 then creates a connection to relay program 210 by initiating out-bound connection 240 through firewall 110 to relay program 210 (step 505). If program 135 is unsuccessful in creating outbound connection 240 (step 510), the attempted connection is terminated (step 515). If out-bound connection 240 is successfully created, program 140 then attempts to create a connection to relay program 210 through firewall 120, illustrated in FIG. 2 as out-bound connection 230 (step 520). If the creation of out-bound connection 230 is unsuccessful (step 525), the attempted connection is terminated, as before (step 515). On the other hand, if the creation of out-bound connection 230 is successful, relay program 210 begins relaying data between programs 135 and 140 (step 530). The relaying of data between programs 135 and 140 continues until out-bound connection 230 and/or out-bound connection 240 is either disconnected or fails (step 535). Once one or both of these connections have failed or been disconnected, any remaining connections are terminated (step 515).

FIG. 5B is a flow diagram illustrating a process for communicating data between programs 135 and 140 in the case where program 135 requires an in-bound connection. The exemplary communications process of FIG. 5B begins with the execution of protocol daemon 250 on computer system 105 (step 540). Next, relay program 210 is initiated on computer system 220 (step 545). Protocol daemon 250 then attempts to create a connection to program 135 (illustrated in FIG. 2 as internal connection 260) (step 550). If internal connection 260 is not successfully created (step 555), all pending, related connections are terminated in order to avoid leaving open any connections related to the failed connection attempt, which is normally the desired case (step 560). It will be apparent to one of skill in the art, however, that one or more of the remaining connections can be left open, if desired.

If internal connection 260 is successfully created, protocol daemon 250 then attempts to create a connection to relay program 210 via firewall 110 and network 115 (step 565). As before, if this connection (depicted in FIG. 2 as out-bound connection 270) is not successfully created (step 570), any pending, related connections are terminated (step 560). If out-bound connection 270 to relay program 210 is successfully created, program 140 then attempts to create a connection to relay program 210 (depicted in FIG. 2 as out-bound connection 230) (step 575). Once again, if out-bound connection 230 is not successfully created (step 580), the attempted connection is terminated (step 560).

As will be apparent to one of skill in the art, although the initialization and execution of the various programs involved and the initialization of connections between those programs are depicted in FIGS. 5A and 5B as occurring in a specific sequence, and are described in that manner, their actual order has no substantive effect on the operation of a network architecture according to an embodiment of the present invention. That being the case, for example, out-bound connection 240 (or out-bound connection 270) can be initiated before or after the initiation of out-bound connection 230. Once a connection from program 140 to relay program 210 is initiated, data may be relayed between programs 135 and 140 by protocol daemon 250 and relay program 210 (step 585). This relaying of data continues until one or both of out-bound connections 230 and/or 270 either fail or are disconnected (step 590), at which time any remaining connections are terminated (step 560).

Figure 6:
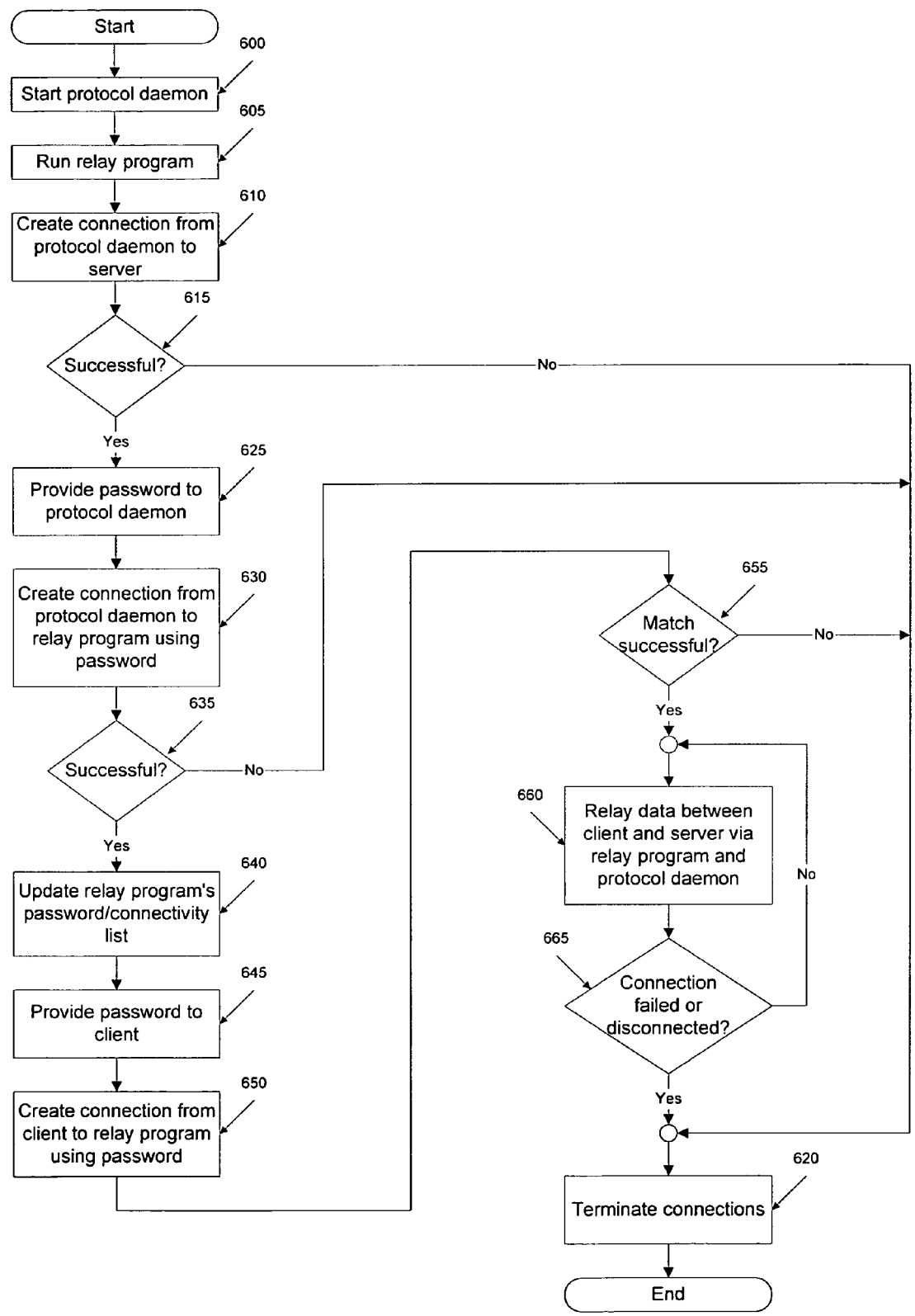
FIG. 6 is a flow diagram illustrating an overall process for relaying information between programs according to one embodiment of the present invention that employs a password protocol.

FIG. 6 is a flow diagram illustrating the overall process of using relay program 210 and protocol daemon 250 to create a connection between programs 135 and 140 through firewalls 110 and 120. It will also be noted that the process of FIG. 6 employs passwords both to identify the proper connections to be made and provide an additional level of security. The process of creating such a connection begins with the execution of protocol daemon 250 on computer system 105 (step 600) and the initiation of relay program 210 on computer system 220 (step 605). Next, protocol daemon 250 attempts to create a connection to program 135 (depicted in FIG. 2 as internal connection 260) (step 610). If the creation of internal connection 260 is unsuccessful (step 615), the attempted connection is terminated (step 620). If internal connection 260 is successfully created, a password for use in connecting to relay program 210 is provided to protocol daemon 250 (step 625). Protocol daemon 250 then attempts to create a connection to relay program 210 (depicted in FIG. 2 as outbound connection 270) using the password provided (step 630). As before, if out-bound connection 270 cannot be successfully created (step 635), the attempted connection and any other related connections are terminated (step 620). If the connection from protocol daemon 250 to relay program 210 is successfully created, the password/connectivity list of relay program 210 is updated (step 640).

Next, a password corresponding to that given to protocol daemon 250 is provided to program 140 (step 645). As will be understood by one of skill in the art, this corresponding password may be identical to that provided to protocol daemon 250, or a mapping technique, such as a hashing algorithm or some other mapping, may be employed to determine correspondence between passwords. Once the password has been provided to program 140 (e.g., a client), program 140 attempts to connect to relay program 210 via firewall 120 using the password (step 650). As illustrated in FIG. 4, relay program 210 attempts to match the password to that of a pre-existing connection listed in its password/connectivity list (step 655).

As with the other connection failures previously described, if the matching process is unsuccessful, related outstanding connections may be terminated (step 620). Alternatively, the connections already appearing as entries in the connectivity list of relay program 210 may simply be allowed to remain, and await further attempts at connection. If a connection having a matching password is found, protocol daemon 250 and relay program 210 begin relaying data between programs 135 and 140 (step 660). This relaying of data continues until one or more of the connections thus formed either fail or are disconnected (step 665) at which time the remaining connections may also be terminated (step 620), although this need not necessarily be the case, as indicated previously.

Figure 7:
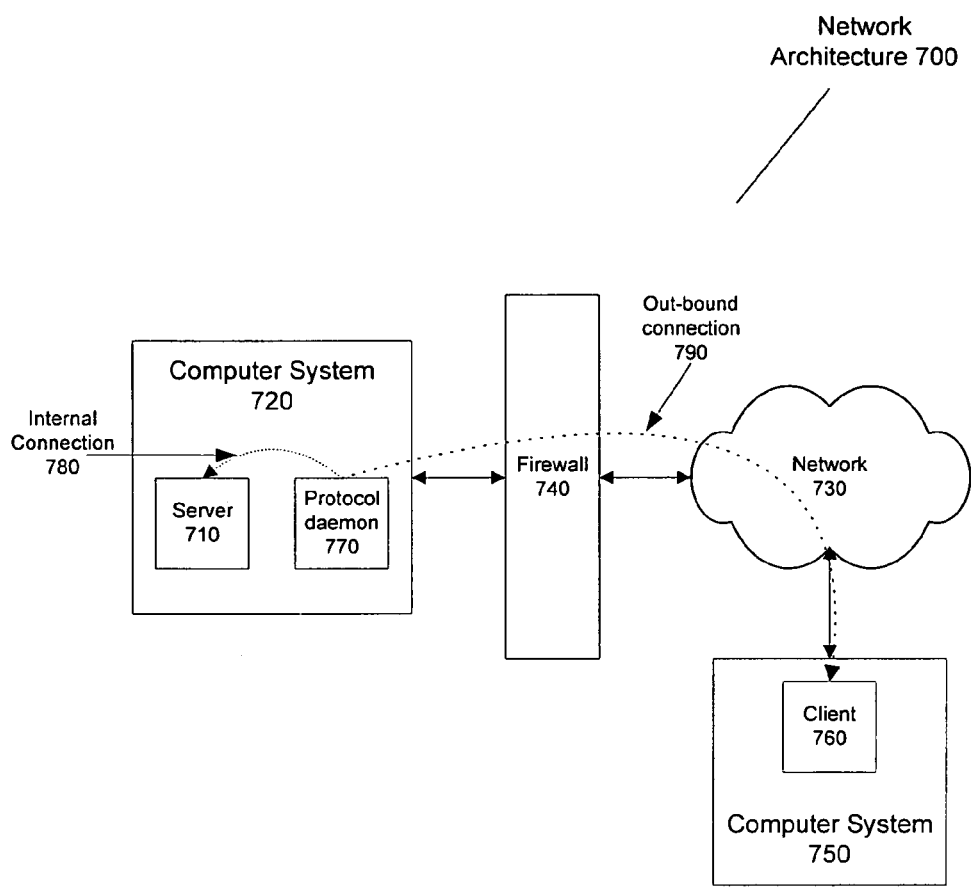
FIG. 7 is a block diagram illustrating a network architecture according to another embodiment of the present invention.

FIG. 7 is a block diagram illustrating a network architecture 700 according to another embodiment of the present invention. In this embodiment, a server 710 is run on a computer system 720 and is configured to accept only in-bound connections. Computer system 720 is coupled to a network 730 via a firewall 740. Firewall 740 is configured to allow only out-bound connections from computer systems protected thereby (e.g., computer system 720). As noted previously, firewall 740 can protect computer systems such as computer system 720 in a number of ways. For example, firewall 740 can protect computer system 720 by allowing only out-bound connections (i.e., preventing in-bound connections from network 730). This means that connections can only be created by a protected computer system, and not by outside computer systems, thus preventing access initiated by outside entities.

Also coupled to network 730 is a computer system 750 that runs a client 760. As can be seen in FIG. 7, computer system 750 is coupled directly to network 730 (i.e., computer system 750 is not protected by a firewall such as firewall 740). That being the case, client 760 may be configured to receive in-bound connections without the obstacles that a firewall coupled between computer system 750 and network 730 would present. However, assuming server 710 requires an in-bound connection, firewall 740 presents such obstacles to a connection between client 760 and server 710. In order to overcome such obstacles, a protocol daemon 770 is provided on computer system 720.

Protocol daemon 770 initiates an internal connection 780 to server 710, and also initiates an out-bound connection 790 to client 760. By initiating internal connection 780 to server 710, protocol daemon 770 addresses the need of server 710 for an in-bound (in relative terms) connection. In a similar manner, by initiating out-bound connection 790 to client 760, protocol daemon 770 addresses the restrictions placed on connections by firewall 740. As before, protocol daemon 770 couples internal connection 780 and out-bound connection 790 allowing the transfer of data through firewall 740 without requiring firewall 740 to admit an in-bound connection. As has been alluded to, the difficulty in initiating a connection through firewall 740 is problematic because of the need of server 710 for an in-bound connection and the preclusion of such connection by firewall 740. The inventors determined that, if client 760 only supports out-bound connections (i.e., is only capable of initiating connections and not receiving connections), a process such as protocol daemon 770 (or relay program 210) should be provided. Such a process should be provided either on computer system 750 or on a computer system coupled between computer system 750 and firewall 740, so as to be able to receive out-bound connection 790 and couple that connection to an out-bound connection from client 760 (in the manner depicted in FIG. 2).

Figure 8:
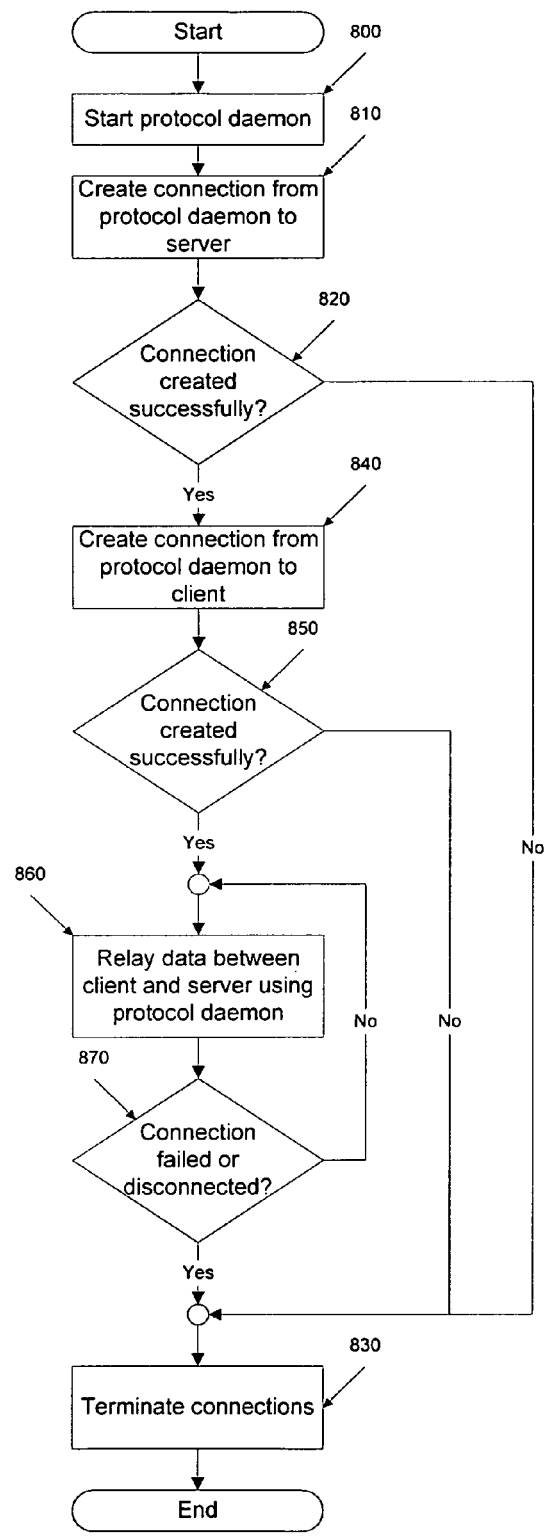
FIG. 8 is a flow diagram illustrating an overall process for relaying information between programs according to an embodiment of the present invention such as that of FIG. 7.

FIG. 8 is a flow diagram illustrating a process for data transfer in a network such as that depicted as network architecture 700. As before, the process begins by executing protocol daemon 770 (step 800). Protocol daemon 770 then attempts to create a connection to server 710 (depicted in FIG. 7 as internal connection 780) (step 810). If the creation of internal connection 780 is unsuccessful (step 820), the attempted connection (and optionally any related connections) is terminated (step 830). If internal connection 780 is successfully created, protocol daemon 770 then attempts to create a connection to client 760 (depicted in FIG. 7 as out-bound connection 790) (step 840). If the creation of outbound connection 790 is unsuccessful (step 850), the attempted connection (and any existing related connections) are terminated (step 830), again assuming that the termination of existing connections is desired. If outbound connection 790 is successfully created, protocol daemon 770 then begins relaying data between client 760 and server 710 (step 860). This relaying of data continues until one or both of internal connection 780 and out-bound connection 790 either fail or are disconnected (step 870), at which time any remaining connections may be terminated, if desired (step 830).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
providing a plurality of sockets, wherein
   each socket has an associated connection and an associated security token,
   each associated connection is inbound relative to a relay program, and
   the associated security token is provided by the associated connection;
receiving a first connection and a first security token at a relay program, wherein
   the first connection is inbound relative to the relay program;
creating a socket associated with the first connection, wherein
   the creating comprises associating the first security token with the first connection;
comparing the first security token with the associated security tokens; and
in response to said comparing,
   if none of the associated security tokens match the first security token, including
      the socket in the plurality of sockets, and
   if the first security token and a security token associated with one of the plurality of sockets match, coupling an end point of the first connection to an end point of a connection associated with the socket associated with the matching security token, wherein
      a security token is a password, and
      the connection associated with the socket is inbound relative to the relay program.

2. The method of claim 1 further comprising:
in response to said comparing, if none of the associated security tokens match the first security token,
   upon a determination that the first connection is not to be associated with a socket, disconnecting the first connection.

3. The method of claim 1, wherein the coupling comprises:
relaying a data stream between the first connection and the connection associated with the socket.

4. The method of claim 1, wherein the coupling comprises:
creating a single connection comprising the first connection and the connection associated with the socket.

5. The method of claim 1 further comprising:
decoupling the first connection and the connection associated with the socket from one another.

6. The method of claim 5, wherein
the decoupling decouples the first connection and the connection associated with the socket upon one of failure and disconnect of one of the first connection and the connection associated with the socket.

7. The method of claim 1, wherein
the first connection is transmitted through a first firewall program.

8. The method of claim 7, wherein
the first connection is created by a protocol daemon.

9. The method of claim 8, wherein
a second connection connects the protocol daemon to a first program, and
the protocol daemon couples the first connection and the second connection to one another.

10. The method of claim 9, wherein the protocol daemon couples the first connection and the second connection to one another by virtue of the protocol daemon
   relaying a data stream between the first socket and the socket associated with the matching security token.

11. The method of claim 10, wherein
the first program provides the first security token.

12. A method comprising:
creating a first connection from a first program to a relay program, wherein
   the first connection is inbound to the relay program;
receiving a first security token from the first program at the relay program, wherein
   the first security token is a password;
providing the first security token to the relay program;
creating a socket associated with the first connection, wherein
   the creating comprises associating the first security token with the first connection;
comparing the first security token with one or more security tokens associated with one or more corresponding connections, wherein
   each one of the one or more corresponding connections is inbound to the relay program; and
in response to said comparing,
   if the first security token and a security token associated with a corresponding connection match,
      coupling the second connection to the connection associated with the matching security token, and
   if none of the associated security tokens match the first security token,
      creating a second connection to the relay program, wherein
         the second connection is inbound to the relay program,
      upon successful creation of the second connection,
         including the second connection with said one or more corresponding connections, and
         coupling the first connection and the second connection to one another.

13. The method of claim 12, wherein
the second connection is transmitted through a firewall program.

14. The method of claim 13, wherein
a protocol daemon program performs
   the creating the first connection,
   the creating the second connection,
   the receiving the first security token from the first program,
   the providing the first security token to the relay program, and
   the coupling the first connection to the second connection.

15. The method of claim 14, wherein
the protocol daemon program and the firewall program are resident on a single computer.

16. The method of claim 14, wherein
the protocol daemon program and the first program are resident on a single computer.

17. The method of claim 12 further comprising:
relaying a data stream between the first connection and the second connection.

18. The method of claim 12 further comprising:
terminating the first connection and the second connection.

19. The method of claim 12, wherein
the connection associated with the matching security token is initiated by a second program.

20. The method of claim 12, wherein
the relay program relays data between the second connection and the connection associated with the matching security token.

21. An apparatus comprising:
means for providing a plurality of sockets, wherein
    each socket has an associated connection and an associated security token,
    each associated connection is inbound relative to a relay program, and
    the associated security token is provided by the associated connection;
means for receiving a first connection and a first security token;
means for creating a socket associated with the first connection, wherein
    means for creating comprises means for associating the first security token with the first connection;
means for comparing the first security token with the associated security tokens; and
in response to said comparing,
    means for including the socket in the plurality of sockets, if none of the associated security tokens match the first security token, and
    means for coupling an endpoint of the first connection to an endpoint of the connection associated with the socket associated with the matching security token, if the first security token and a security token associated with one of the plurality of sockets match, wherein a security token is a password.

22. The apparatus of claim 21 further comprising:
in response to said comparing, if none of the associated security tokens match the first security token,
    means for disconnecting the first connection, upon a determination that the first connection is not to be associated with a socket.

23. The apparatus of claim 21, wherein the means for coupling comprises:
means for relaying a data stream between the first connection and the connection associated with the socket.

24. The apparatus of claim 21, wherein the means for coupling comprises:
means for creating a single connection comprising the first connection and the connection associated with the socket.

25. The apparatus of claim 21 further comprising:
means for decoupling the first connection and the connection associated with the socket.

26. The apparatus of claim 25, wherein
the means for decoupling is configured to decouple the first connection and the connection associated with the socket upon one of failure and disconnect of one of the first connection and the connection associated with the socket.

27. The apparatus of claim 21, wherein
the first connection is transmitted through a first firewall program.

28. An apparatus comprising:
means for creating a first connection from a first program to a relay program;
    the first connection is inbound to the relay program;
means for receiving a first security token from the first program, wherein
    the first security token is a password;
means for providing the first security token to the relay program,
means for creating a socket associated with the first connection, wherein
    the means for creating comprises means for associating the first security token with the first connection;
means for comparing the first security token with one or more security tokens associated with one or more corresponding connections, wherein
    each one of the one or more corresponding connections is inbound to the relay program; and
in response to said comparing,
    means for coupling a second connection and the connection associated with the matching security token, if the first security token and a security token associated with a corresponding connection match, wherein the second connection is the corresponding connection, and
    means for creating a second connection to a relay program, if none of the associated security tokens match the first security token, wherein
        the second connection is inbound to the relay program, and
        upon successful creation of the second connection,
            means for including the second connection with said one or more corresponding connections, and
            means for coupling the first connection and the second connection to one another.

29. The apparatus of claim 28 further comprising
means for transmitting the second connection through a firewall program.

30. The apparatus of claim 28 further comprising:
means for relaying a data stream between the first connection and the second connection.

31. The apparatus of claim 28 further comprising:
means for terminating the first connection and the second connection.

32. The apparatus of claim 28, wherein
the connection associated with the matching security token is initiated by a second program.

33. The apparatus of claim 28, wherein the relay program further comprises:
means for relaying data between the second connection and the connection associated with the matching security token.

34. A computer program product encoded in a computer readable storage media, the computer program product comprising:
a first set of instructions, executable by a processor and configured to cause the processor to provide a plurality of sockets, wherein
    each socket has an associated connection and an associated security token,
    each associated connection is inbound relative to a relay program, and
    the associated security token is provided by the associated connection;
a second set of instructions, executable by the processor and configured to cause the processor to receive a first connection and a first security token at the relay program, wherein
    the first connection is inbound relative to the relay program;
a third set of instructions, executable by the processor and configured to cause the processor to create a socket associated with the first connection, wherein-the third set of instructions comprises
    a first subset of instructions, executable by a processor and configured to cause the processor to associate the first security token with the first connection;

a fourth set of instructions, executable by the processor and configured to cause the processor to compare the first security token with the associated security tokens;

a fifth set of instructions, executable by the processor and configured to cause the processor to include the socket in the plurality of sockets, in response to said comparing, if none of the associated security tokens match the first security token; and a sixth set of instructions, executable by the processor and configured to cause the processor, in response to the fourth set of instructions, to couple an end point of the first connection and an end point of a connection associated with the socket associated with the matching security token to one another, wherein a security token is a password.

35. The computer program product of claim 34 further comprising:

a seventh set of instructions, executable by the processor, responsive to said comparing, and configured to cause the processor to disconnect the first connection, if none of the associated security tokens match the first security token, and upon a determination that the first connection is not to be associated with a socket.

36. The computer program product of claim 34 further comprising:

an seventh set of instructions, executable by the processor and configured to cause the processor to relay a data stream between the first connection and the connection associated with the socket.

37. The computer program product of claim 34 further comprising:

a seventh set of instructions, executable by the processor and configured to cause the processor to create a single connection comprising the first connection and the connection associated with the socket.

38. The computer program product of claim 34 further comprising:

a seventh set of instructions, executable by the processor and configured to cause the processor to decouple the first connection and the connection associated with the socket.

39. The computer program product of claim 38 further comprising:

an eighth set of instructions, executable by the processor and configured to cause the processor to decouple the first connection and the connection associated with the socket upon one of failure and disconnect of one of the first connection and the connection associated with the socket.

40. The computer program product of claim 34, wherein the first connection is transmitted through a first firewall program.

41. A computer program product encoded in a computer readable storage media, the computer program product comprising:

a first set of instructions, executable by a first processor and configured to cause the first processor to create a first connection from a first program to a relay program, wherein the first connection is inbound to the relay program;

a second set of instructions, executable by the first processor and configured to cause the first processor to receive a first security token from the first program to the relay program, wherein the first security token is a password, and said second set of instruction comprises a first subset of instructions providing the first security token to the relay program;

a third set of instructions, executable by the first processor and configured to cause the first processor to create a socket associated with the first connection, wherein said third set of instructions comprises a second subset of instructions, executable by the first processor and configured to cause the first processor to associate the first security token with the first connection;

a fourth set of instructions, executable by the first processor and configured to cause the first processor to compare the first security token with one or more security tokens associated with one or more corresponding connections;

a fifth set of instructions, executable by the first processor and configured to cause the first processor to create a second connection to a relay program;

a sixth set of instructions, executable by the first processor and configured to cause the first processor to provide the first security token to the relay program;

a seventh set of instructions, executable by the first processor and configured to cause the first processor to couple the first connection to the second connection upon successful creation of the second connection;

an eighth set of instructions executable by a second processor, responsive to said comparing, and configured to cause the second processor to couple the second connection to the connection associated with the matching security token if the first security token and a security token associated with a corresponding connection match; and a ninth set of instructions, executable by the second processor, responsive to said comparing, and configured to cause the second processor to include the second connection with said one or more corresponding connections if none of the associated security tokens match the first security token.

42. The computer program product of claim 41, wherein the second connection is transmitted through a firewall program.

43. The computer program product of claim 41 further comprising:

a tenth set of instructions, executable by the first processor and configured to cause the first processor to relay a data stream between the first connection and the second connection.

44. The computer program product of claim 41 further comprising:

a tenth set of instructions, executable by the first processor and configured to cause the first processor to terminate the first connection and the second connection.

45. The computer program product of claim 41, wherein the connection associated with the matching security token is initiated by a second program.

46. The computer program product of claim 41, wherein the relay program further comprises:

a subset of instructions, executable by the second processor, configured to cause the second processor to relay data between the second connection and the connection associated with the matching security token.

* * * * *